(12) United States Patent
Hubrich et al.

(10) Patent No.: US 8,985,302 B2
(45) Date of Patent: Mar. 24, 2015

(54) COMPACT SPREADER

(75) Inventors: Frank Hubrich, Dresden (DE); Dieter Hoffmann, Leipzig (DE)

(73) Assignee: TAKRAF GmbH, Leipzig (DE)

( * ) Notice: Subject to any disclaimer, the term of this patent is extended or adjusted under 35 U.S.C. 154(b) by 6 days.

(21) Appl. No.: 13/818,239

(22) PCT Filed: May 26, 2011

(86) PCT No.: PCT/DE2011/001121
§ 371 (c)(1),
(2), (4) Date: Apr. 25, 2013

(87) PCT Pub. No.: WO2012/025074
PCT Pub. Date: Mar. 1, 2012

(65) Prior Publication Data
US 2013/0206543 A1   Aug. 15, 2013

(30) Foreign Application Priority Data

Aug. 24, 2010   (DE) .......................... 10 2010 035 214

(51) Int. Cl.
*B65G 65/28*   (2006.01)

(52) U.S. Cl.
CPC ..................................... *B65G 65/28* (2013.01)
USPC ........................................................ 198/314

(58) Field of Classification Search
None
See application file for complete search history.

(56) References Cited

U.S. PATENT DOCUMENTS

| 3,285,385 A | * | 11/1966 | Langner | ........................ 198/301 |
| 3,650,415 A |   | 3/1972  | Krumrey |                              |
| 7,223,059 B2 | * | 5/2007 | Smith et al. | .................... 414/505 |

FOREIGN PATENT DOCUMENTS

| DE | 1 910 242 B  | 9/1970 |
| DE | 150 035 A1   | 8/1981 |
| DE | 33 27 202 A1 | 2/1984 |
| DE | 84 18 558 U1 | 10/1984 |
| DE | 79 08 310 U1 | 7/1985 |
| DE | 35 21 033 A1 | 12/1986 |
| DE | 35 32 182 A1 | 3/1987 |
| DE | 39 34 053 A1 | 4/1991 |
| GB | 348 236      | 5/1931 |
| WO | 88/02731 A1  | 4/1988 |

OTHER PUBLICATIONS

Kurth: Reihe Fördertechnik, Band Tagebaugroßgeräte and Universalbagger, Verlag Technik Berlin, 1971, p. 160, illustr. No. 3.129 15 „Bandabsetzer AsRsB-15400.120.
Internet press release of the company Sandvik dated Aug. 16, 2002.
Press release of the company GIBSIN Engineers, Ltd.
Certificate "No load test run" dated Nov. 6, 2007.

(Continued)

*Primary Examiner* — Kavel Singh
(74) *Attorney, Agent, or Firm* — McGlew and Tuttle, P.C.

(57) ABSTRACT

A compact spreader on continuous tracks (10) for use in opencast mining has a discharge boom (70) with a rearward extension designed as a rocker having a counterweight (100). The rocker is suspended centrally in a framework (50) over the turntable (40). Hydraulic cylinders (14) absorb only forces from half of the imposed load. The embodiment according to the invention is suitable for large band widths and discharge projections up to 100 m and eliminates the danger of tipping over.

20 Claims, 3 Drawing Sheets

(56) References Cited

OTHER PUBLICATIONS

Technical drawing of the spreader with the unique type reference VASR 4000/1500-120.

A first photo of a spreader with the unique type reference VASR 4000/1500-120 in the power plant Hsinta.

A second photo of a spreader with the unique type reference VASR 4000/1500-120 in the power plant Hsinta.

Australian Standard AS 4324.1-1995: Mobile equipment for continuous handling of bulk materials, Part 1: General Requirements for the design of steel structures.

* cited by examiner

Fig. 2 - PRIOR ART -

COMPACT SPREADER

CROSS REFERENCE TO RELATED APPLICATIONS

This application is a United States National Phase application of International Application PCT/DE2011/001121 filed May 26, 2011 and claims the benefit of priority under 35 U.S.C. §119 of German Patent Application DE 10 2010 035 214.4 filed Aug. 24, 2010, the entire contents of which are incorporated herein by reference.

FIELD OF THE INVENTION

The invention relates to a mobile compact spreader on crawler tracks for use in opencast mining, the discharge boom with a rearward extension being designed as a rocker having a counterweight.

BACKGROUND OF THE INVENTION

Hitherto, all spreaders on crawler tracks have been built preferably as compact spreaders with a fixed ballast boom, or as C-frame spreaders with a fixed ballast carrier. Compact spreaders have so far been used for discharge projections between 30 and 60 m.

The typical characteristics of such a machine are shown in FIG. 1, as the state of the art 1. Via a slewing connection, a sub-structure bears a turntable 4, on which a gantry framework 5 is positioned, to which the discharge boom 8 is hinged in a central position. Onto the top, the slewable connecting bridge 13 is mounted. The counter boom 9 is designed as a rearward extension of the turntable 4 with anchoring (guys) connected to the framework 5. On its back end, the counter boom 9 bears the counter weight 10, and next to it the containers for housing the electrical system and hydraulic system. The discharge boom 8 is supported on the turntable 4 by means of one or two hydraulic cylinder(s) 14.

It is essential that the discharge boom 8 be completely carried by the hydraulic cylinder(s) 14. These hydraulic cylinder(s) 14 serve to adjust the dumping height.

This requires large hydraulic cylinders 14. However, at the same time it poses the danger that, in the case of a leakage, the spreader will start to bear on the front, and then tip over to the back. This is less critical in a compact spreader, since in this case the counter boom rests closely above the subgrade. The size of the hydraulic cylinders limits the application of a compact spreader regarding its discharge projection and band width.

Publication DE 35 32 182 A1 discloses a belt spreader consisting of a sub-structure equipped with crawler tracks, with a superstructure mounted onto it using a slewing connection, and having on this superstructure a boom in one part, arranged in a horizontal axis and being designed as a rocker.

On the side where material is received, this boom acts as a conveying boom up to the slewing axis, and on the following side, i.e. in conveying direction, it acts as a discharge boom.

To adjust the boom's incline a hydraulic cylinder is intended. At the free end of the conveying boom, the conveyed material is first transferred to the boom by a tripper car, then conveyed over the whole length of the boom, and finally transferred back at the dumping side of the discharge boom. By thus positioning the boom in the center of gravity no counter weight is required.

C-frame spreaders are used for discharge projections between 50 and 100 m. (in extreme cases for direct dumping up to 200 m). The typical characteristics are shown in FIG. 2.

A sub-structure 2 with a 6-crawler tracks carries, via a slewing connection, a turntable 4, which has a gantry framework mounted to its front. On top of this framework, a guyed cable support is mounted, and at its rear, a guyed counter boom 9 is coupled on to it. In lateral view, counter boom 9, framework 5 and turntable 4 are C-shaped. At its rear end, the counter boom 9 bears the counter weight 10, in front of it the hoisting winch for the discharge boom 8, and in front of this it bears the container for the electrical system. The discharge boom 8 having a further cable support is shifted in an articulated manner at the front of the framework 5 and guyed for raising and lowering via a two-cable hoist winch.

An advantage lies here in the fact that there is sufficient height for the upper lashing which limits the forces even in case of great discharge projections. A disadvantage, however, is that the complete superstructure load must be directed in a C-shape around the middle, which must be kept clear for the material transfer. Another disadvantage is that the spreader will tip over to the back in case the cable hoists fail.

Publication DE 84 18 558 U1 discloses a mobile belt spreader on crawler tracks consisting of a sub-structure with a platform mounted on it in a slewing connection. This platform is continued further up as a framework and accommodates the discharge boom in a horizontal slewing axis. At least one hydraulic cylinder, arranged between the platform and the discharge boom, is intended for height adjustment of the discharge boom. On top, the framework accommodates a connecting bridge in a vertical slewing axis. At the bottom, the platform is extended in horizontal direction, leading away from the discharge boom, and encompasses at that point the counter weight and the container for housing the electrical and hydraulic system. In lateral view the platform containing both the framework mounted on top, and the extension below thus appears as a C-shape. At the end intended for material intake, the connecting bridge is supported by a crawler track.

Furthermore, publication DE 1 910 242 B discloses a spreader which also consists, like the equipment described above, of a sub-structure with a platform mounted onto it in a slewing connection, on which a framework is arranged, and just like the superstructure in the first embodiment, it is designed as a C-shape.

It accommodates two slewable discharge booms which are arranged facing each other, with the conveying paths of their respective conveyors running in opposite directions, whereby one conveyor is intended for dumping above work level and the other conveyor for dumping below work level.

In the center of the machine, there is a distribution unit for bulk solids in the transfer area between the conveying belt bridge and the two discharge conveyors. Since the two discharge booms are facing each other, a favourable mass distribution is achieved.

In a second embodiment, the framework of the superstructure is not designed as a C-shape but as a tower. Moreover, these two embodiments differ in that both discharge booms are in one case constructed as consisting of two separate parts, and in the other case, they are constructed having a rigid connection to another, and consisting of a single part.

A slightly different mode of design is known from KURTH: Reihe Fördertechnik, Band Tagebaugroßgeräte and Universalbagger, Verlag Technik Berlin, 1971, page 160, illustr. no 3.129 "Bandabsetzer AsRsB-15400.120".

Further variants have been built over the course of the last decades. All the C-frame spreaders share the common characteristics, that the forces of the superstructure are transferred in a C-shape around the central transfer area. Furthermore, in all the machines mentioned, the discharge boom 8 is completely supported by the hydraulic cylinders, respectively the cable hoists. In case of failure, this leads to loss of stability.

SUMMARY OF THE INVENTION

An underlying object of the invention is to apply the principle of the compact spreader also to larger discharge projections ranging from 50 m to 100 m, to minimize the lifting forces acting on the hydraulic cylinders intended to adjust the dumping height, and to eliminate the danger of tipping over to the back. This may save substantial masses and costs, while at the same time enhancing stability.

This object is essentially achieved by designing the discharge boom and the counter boom having a counter weight as one unit, which is suspended in a gantry framework. As the supporting structure of this rocker requires a height of 10-12% of the discharge projection, the connecting bridge must be at least as long as the discharge projection.

Further details of the invention are explained in the exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
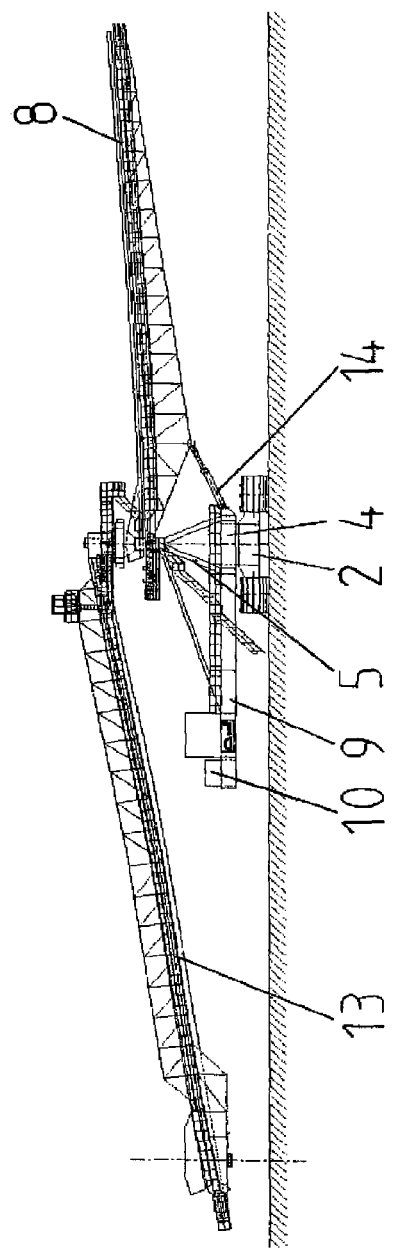
FIG. 1 is a lateral view showing a compact spreader with a fixed ballast boom.
Figure 2:
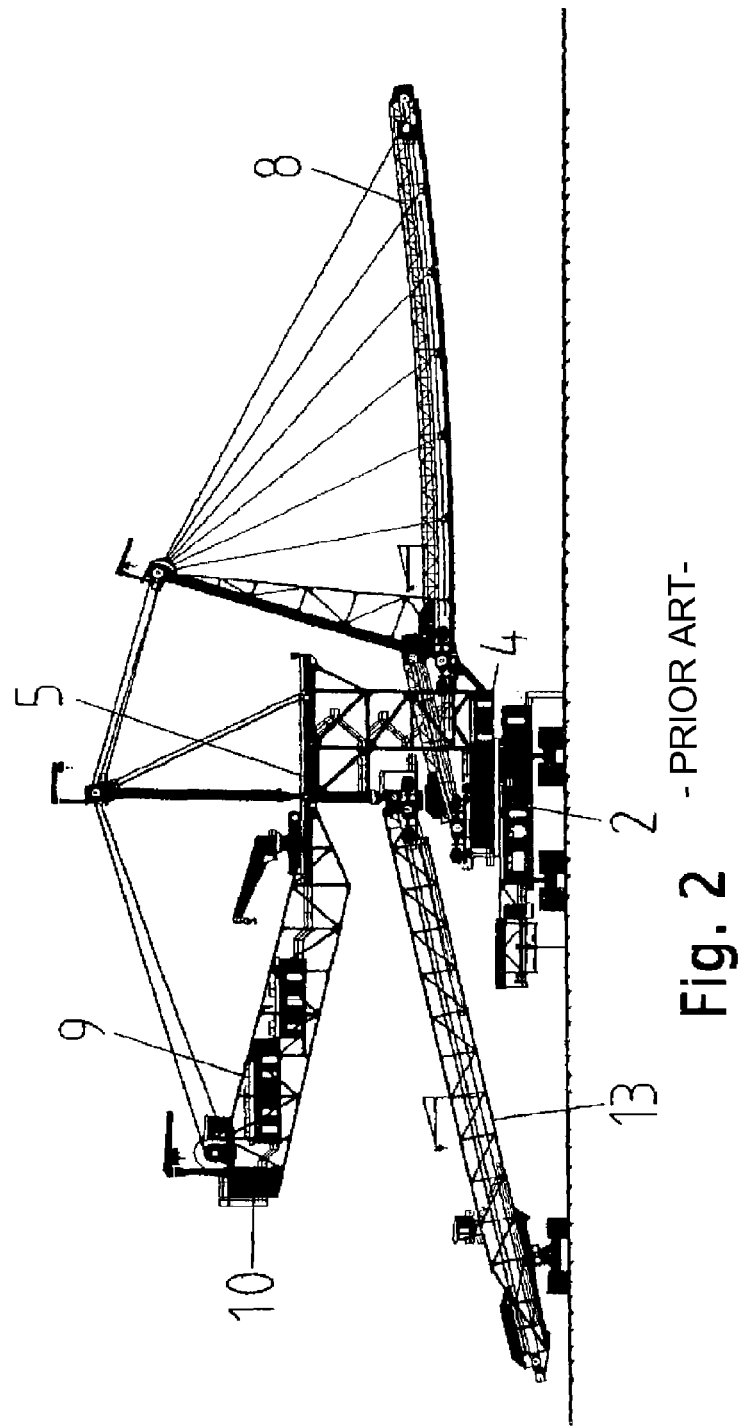
FIG. 2. is a lateral view showing typical characteristics of a C-frame spreader.
Figure 3:
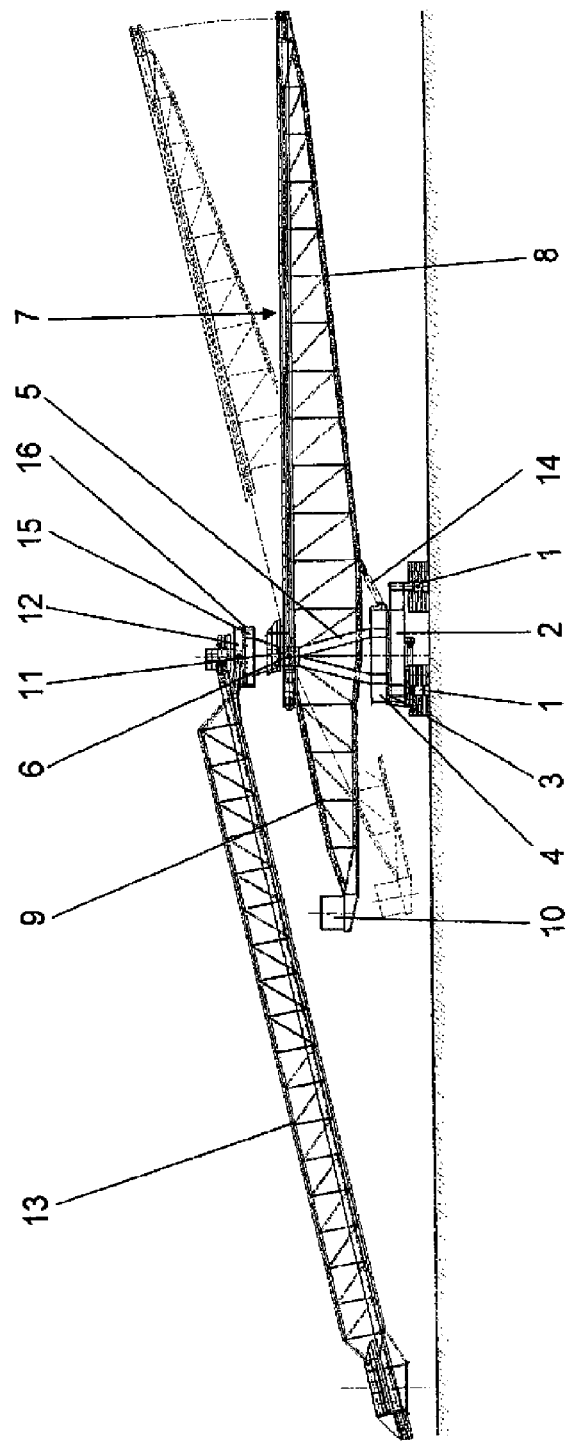
FIG. 3 is a lateral view showing a novel spreader type according to the invention, executed in compact design for larger projections and higher conveying capacity.

Referring to the drawings and in particular to FIG. 3, the novel spreader type according to the invention, executed in compact design for larger projections and higher conveying capacity is shown in a lateral view.

A sub-structure 20 is equipped with a six-crawler track 10 and carries, via a ball race, 30 a turntable 40. On this turntable 40, a gantry framework 50 is mounted in central position, which supports, via two large axles 60, the rocker 70 having a discharge boom 80 to the front and a counter boom 90 with its counter weight 100 to the back. At a top of the framework 5, a cross-connection 110 is provided with a ring carrier 150. On the this ring carrier 150, a small turntable 120 is mounted via a slewing connection 160, on which turntable the long connecting bridge 130 is supported in an articulated manner.

The rocker 70 is formed of a discharge boom 80, counter boom 90 and counter weight 100. The rocker 70 has ballast applied in such a manner that the momentum without any imposed load to the back is approximately equal to the momentum with imposed load to the front. Thus, the torque differentials, which the hydraulic cylinder(s) 140 must absorb, are minimized. Moreover, as the cylinder lever arm is great, the cylinder forces are small.

In FIG. 3, the rocker 70 with the discharge boom 80, is shown in the main illustration in the lower position. As this makes clear, there is sufficient clearance between the counter weight 100 and the connecting bridge 130. The upper position of the rocker 70 with the discharge boom 80 is shown in thinner, dotted lines. For specific applications, the load-bearing structures of the rocker 70 with the counter weight 100 as well as the connecting bridge 130 can be executed in an optimized manner.

The connecting bridge 130, which is mounted on the upper turntable 40, is by approximately 10% longer than the discharge projection, and has the same height difference as the discharge boom 80. This is ideal for standardizing the components for the conveyor belts. The long connectying bridge 130 permits a great block width when dumping is done above work level.

It is not possible to position the electrical system and hydraulic system, as has been common hitherto, on a fixed counter boom. Both installations are arranged laterally on platforms on the framework 50. The advantage over a compact spreader according to the state of the art 1 is that the cylinder forces to be absorbed can be reduced to about a quarter, and that a failure of the cable hoist does not present any safety issues. In addition, the cable hoist is less expensive.

The advantage over a common C-frame spreader is that it is not necessary to divert (redirect) any forces more than once, but that these are transmitted directly, and a failure does not have disastrous consequences. Both in steel and in machine construction (cable hoists) costs are saved.

While specific embodiments of the invention have been shown and described in detail to illustrate the application of the principles of the invention, it will be understood that the invention may be embodied otherwise without departing from such principles.

The invention claimed is:

1. A compact spreader comprising:
   a sub-structure with several crawler tracks;
   a slewable superstructure;
   a discharge boom and a counter boom with a counterweight;
   a turntable carried by the sub-structure;
   a gantry framework on the turntable, the gantry framework being provided with an axle;
   at least one hydraulic cylinder;
   an upper turntable and an upper ring carrier on the framework; and
   a long connecting bridge, wherein:
   the discharge boom and the counter boom with the counterweight are designed as a rocker;
   the rocker is shifted via the axle in the gantry framework which is placed in a central position on the turntable;
   the rocker is supported by the at least one cylinder on the turntable in an adjustable manner; and
   the long connecting bridge is supported via the upper turntable and the upper ring carrier on the framework.

2. A compact spreader according to claim 1, wherein said long connecting bridge is connected to said upper turntable at a position above at least a portion of said discharge boom and at least a portion of said counter boom.

3. A compact spreader according to claim 2, wherein the connecting bridge is at least as long as the discharge projection.

4. A compact spreader comprising:
   a sub-structure with several crawler tracks;
   a turntable carried by the sub-structure;
   a gantry framework on the turntable, the gantry framework being provided with an axle;
   a discharge boom and a counter boom with a counterweight, wherein the discharge boom and the counter boom with the counterweight are connected together and the discharge boom and the counter boom together comprise a rocker that is moveable as a single unit;

a hydraulic cylinder, the rocker being supported for movement about the axle with an angle adjustable connection from the rocker to the turntable via the hydraulic cylinder;

an upper turntable and an upper ring carrier on the framework; and a connecting bridge connected to the upper turntable and the upper ring carrier at a position above at least a portion of said rocker.

5. A compact spreader according to claim 4, wherein said at least said portion of said rocker is located between said upper turntable sand said turntable carried by the sub-structure.

6. A compact spreader according to claim 5, wherein at least a portion of said connecting bridge is located at a position above said counter boom.

7. A compact spreader according to claim 5, wherein said hydraulic cylinder engages said turntable carried by the sub-structure and said at least said portion of said rocker.

8. A compact spreader according to claim 5, wherein said hydraulic cylinder extends between said turntable carried by the sub-structure and said at least said portion of said rocker.

9. A compact spreader according to claim 5, wherein a portion of said connecting bridge is in direct contact with at least one of said ringer carrier and said upper turntable.

10. A compact spreader according to claim 5, wherein said ringer carrier is located at a ring carrier height and said upper turntable is located at an upper turntable height, said counter boom having a counter boom height, said ring carrier height and said upper turntable height being greater than said counter boom height.

11. A compact spreader according to claim 5, wherein said ringer carrier is located at a ring carrier height and said upper turntable is located at an upper turntable height, said at least said portion of said rocker having a rocker portion height, said ring carrier height and said upper turntable height being greater than said rocker portion height.

12. A compact spreader according to claim 2, wherein the rocker is supported at a height that is 10-12% of a discharge projection defined by the projection of the discharge boom, said at least one hydraulic cylinder extending between said turntable and at least a portion of said discharge boom.

13. A compact spreader according to claim 2, wherein at least a portion of said rocker extends between said upper turntable and said turntable carried by the sub-structure.

14. A compact spreader according to claim 2, wherein a portion of said connecting bridge is in direct contact with at least one of said ringer carrier and said upper turntable.

15. A compact spreader comprising:

a sub-structure comprising several crawler tracks;

a turntable carried by the sub-structure;

a gantry framework on the turntable, the gantry framework being provided with an axle;

a discharge boom and a counter boom with a counterweight, said discharge boom being connected to said counter boom with said counterweight to form a single movable rocker structure;

a hydraulic cylinder, the rocker structure being supported for movement about the axle with an angle adjustable connection from the rocker structure to the turntable via the hydraulic cylinder;

an upper turntable and an upper ring carrier on the framework; and a connecting bridge connected to the upper turntable and the upper ring carrier, at least a portion of said rocker structure being located between said upper turntable and said turntable carried by the sub-structure.

16. A compact spreader according to claim 15, wherein at least a portion of said connecting bridge is located at a position above said counter boom.

17. A compact spreader according to claim 15, wherein said long connecting bridge is connected to one or more of said upper turntable and said ring carrier at a position above at least said portion of said rocker structure.

18. A compact spreader according to claim 15, wherein said hydraulic cylinder extends between said turntable carried by the sub-structure and at least a portion of said rocker structure, said upper turntable and said ring carrier being located at position above at least said counter boom.

19. A compact spreader according to claim 15, wherein a portion of said connecting bridge is in direct contact with at least one of said ringer carrier and said upper turntable.

20. A compact spreader according to claim 15, wherein said ringer carrier is located at a ring carrier height and said upper turntable is located at an upper turntable height, said counter boom having a counter boom height, said ring carrier height and said upper turntable height being greater than said counter boom height.

* * * * *